US008664784B2

(12) United States Patent
Janca et al.

(10) Patent No.: US 8,664,784 B2
(45) Date of Patent: Mar. 4, 2014

(54) LOUVERED TURBINE FOR GENERATING ELECTRIC POWER FROM A WATER CURRENT

(75) Inventors: Phillip Todd Janca, Wichita Falls, TX (US); Phillip Paul Janca, Archer City, TX (US)

(73) Assignee: Gulfstream Technologies, Inc., Olney, TX (US)

( * ) Notice: Subject to any disclaimer, the term of this patent is extended or adjusted under 35 U.S.C. 154(b) by 742 days.

(21) Appl. No.: 12/330,387

(22) Filed: Dec. 8, 2008

(65) Prior Publication Data
US 2009/0091135 A1     Apr. 9, 2009

Related U.S. Application Data

(63) Continuation of application No. PCT/US2008/071239, filed on Jul. 25, 2008, and a continuation-in-part of application No. 11/519,607, filed on Sep. 12, 2006, now Pat. No. 7,471,006.

(60) Provisional application No. 60/716,063, filed on Sep. 12, 2005.

(51) Int. Cl.
*F03B 13/10*     (2006.01)

(52) U.S. Cl.
USPC ............................................. 290/43; 290/54

(58) Field of Classification Search
USPC ............... 290/43, 54; 415/3.1, 210.1; 416/86, 416/101, 111, 119
See application file for complete search history.

(56) References Cited

U.S. PATENT DOCUMENTS

| 291,766 | A | * | 1/1884 | Petersen | 416/119 |
| 315,263 | A | * | 4/1885 | Emmett | 416/101 |
| 646,712 | A | * | 4/1900 | Symons | 416/86 |
| 646,713 | A | * | 4/1900 | Symons | 416/86 |

(Continued)

FOREIGN PATENT DOCUMENTS

| GB | 2190144 | 11/1987 | | |
| GB | 2190144 | A * | 11/1987 | ............... F03B 7/00 |

OTHER PUBLICATIONS

International search report in a corresponding PCT application (i.e. PCT/US2008/071239), dated Feb. 27, 2009 (2 pages).

(Continued)

*Primary Examiner* — Tulsidas C Patel
*Assistant Examiner* — S. Mikailoff
(74) *Attorney, Agent, or Firm* — Maginot, Moore & Beck, LLP

(57) ABSTRACT

A subsurface power generating system in one embodiment includes a frame, an electric generator supported by the frame and operably connected to a first vertical rotor, another electric generator supported by the frame and operably connected to a second vertical rotor, a first louver operably connected to the first vertical rotor and including a front side, and a back side, and pivotable between a first position whereat the back side is in contact with a first pivot limiting structure, and a second position whereat the back side is not in contact with the first pivot limiting structure, and a second louver operably connected to the second vertical rotor and including a front side, and a back side, and pivotable between a third position whereat the back side is in contact with a second pivot limiting structure, and a fourth position whereat the back side is not in contact with the second pivot limiting structure.

1 Claim, 12 Drawing Sheets

(56) References Cited

U.S. PATENT DOCUMENTS

| | | | |
|---|---|---|---|
| 806,817 A * | 12/1905 | Mather | 416/86 |
| 1,076,713 A * | 10/1913 | Southwick | 416/119 |
| 1,120,109 A * | 12/1914 | Watson | 416/119 |
| 1,283,248 A * | 10/1918 | Manning | 416/111 |
| 1,315,587 A * | 9/1919 | Wyborney | 416/119 |
| 2,310,816 A * | 2/1943 | Taylor | 415/141 |
| 3,912,937 A * | 10/1975 | Lesser | 290/43 |
| 3,928,771 A * | 12/1975 | Straumsnes | 290/43 |
| 3,978,345 A | 8/1976 | Bailey | |
| 4,026,587 A | 5/1977 | Hultman et al. | |
| 4,205,943 A | 6/1980 | Vauthier | |
| 4,256,970 A | 3/1981 | Tomassini | |
| 4,274,009 A | 6/1981 | Parker, Sr. | |
| 4,292,535 A | 9/1981 | Diggs | |
| 4,306,157 A | 12/1981 | Wracsaricht | |
| 4,313,059 A | 1/1982 | Howard | |
| 4,335,319 A | 6/1982 | Mettersheimer, Jr. | |
| 4,383,182 A | 5/1983 | Bowley | |
| 4,520,273 A * | 5/1985 | Rowe | 290/54 |
| 4,686,376 A | 8/1987 | Retz | |
| 4,818,888 A * | 4/1989 | Lenoir, III | 290/43 |
| 4,850,190 A | 7/1989 | Pitts | |
| 5,230,215 A | 7/1993 | Nagata | |
| 5,324,988 A * | 6/1994 | Newman | 290/54 |
| 5,440,176 A | 8/1995 | Haining | |
| 5,553,996 A * | 9/1996 | Farrar | 415/2.1 |
| 5,798,572 A | 8/1998 | Lehoczky | |
| 5,844,323 A * | 12/1998 | Hung | 290/54 |
| 6,091,161 A | 7/2000 | Dehlsen et al. | |
| 6,104,097 A | 8/2000 | Lehoczky | |
| 6,109,863 A * | 8/2000 | Milliken | 415/1 |
| 6,471,470 B2 * | 10/2002 | Yoshimura et al. | 415/160 |
| 6,531,788 B2 | 3/2003 | Robson | |
| 6,688,842 B2 * | 2/2004 | Boatner | 415/4.2 |
| 6,688,925 B2 | 2/2004 | Garcia | |
| 6,734,576 B2 * | 5/2004 | Pacheco | 290/55 |
| 6,800,955 B2 * | 10/2004 | McDavid, Jr. | 290/54 |
| 6,856,036 B2 * | 2/2005 | Belinsky | 290/42 |
| 7,105,942 B2 | 9/2006 | Henricksen | |
| 7,307,356 B2 | 12/2007 | Fraenkel | |
| 7,875,990 B2 * | 1/2011 | Wang et al. | 290/43 |
| 8,120,196 B1 * | 2/2012 | Neese | 290/54 |
| 8,152,441 B2 * | 4/2012 | Hofmann | 415/4.1 |
| 8,348,623 B2 * | 1/2013 | Vasshus et al. | 417/3 |
| 8,497,594 B2 * | 7/2013 | Rajadhyaksha et al. | 290/53 |
| 2003/0066934 A1 | 4/2003 | Bolonkin | |
| 2003/0185666 A1 * | 10/2003 | Ursua | 415/4.2 |
| 2003/0235498 A1 * | 12/2003 | Boatner | 416/119 |
| 2004/0070210 A1 | 4/2004 | Johansen et al. | |
| 2004/0189010 A1 | 9/2004 | Tharp | |
| 2004/0201223 A1 | 10/2004 | Grinsted et al. | |
| 2005/0132700 A1 | 6/2005 | Newman | |
| 2006/0251510 A1 | 11/2006 | Gray et al. | |
| 2007/0241566 A1 | 10/2007 | Kuehnle | |
| 2007/0296218 A1 * | 12/2007 | Jonsson | 290/55 |
| 2010/0283254 A1 * | 11/2010 | Richter et al. | 290/55 |
| 2011/0254273 A1 * | 10/2011 | Hallett | 290/52 |
| 2011/0255972 A1 * | 10/2011 | Lew | 416/111 |
| 2011/0272946 A1 * | 11/2011 | Kumano | 290/54 |
| 2012/0007361 A1 * | 1/2012 | Agtuca | 290/43 |
| 2013/0026761 A1 * | 1/2013 | Rajadhyaksha et al. | 290/54 |
| 2013/0026762 A1 * | 1/2013 | Rajadhyaksha et al. | 290/54 |

OTHER PUBLICATIONS

International search report in a corresponding PCT application (i.e. PCT/US2009/035747), dated Apr. 28, 2009 (2 pages).

Segergren, E., Direct Drive Generator for Renewable Power Conversion from Water Currents, 2005, 46 pages.

Fraenkel, P., Marine Current Turbines™: progress with tidal turbine development, 2005, 6 pages.

Fraenkel, P., Marine Current Turbines: feedback on experience so far, 2004, 32 pages.

Nortek As: Aquadopp (Reg. U.S. Pat & Tm. Off.) Open Water 3D Current Meter, 2004, 4 pages.

International Water Power: Kite soars to new depths, 2006, 7 pages.

International Water Power: Stream of developments, 2006, 9 pages.

\* cited by examiner

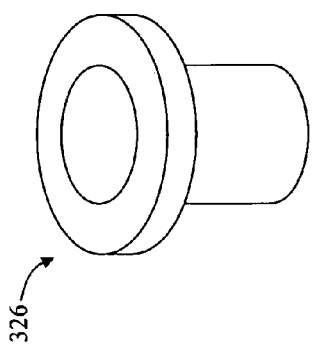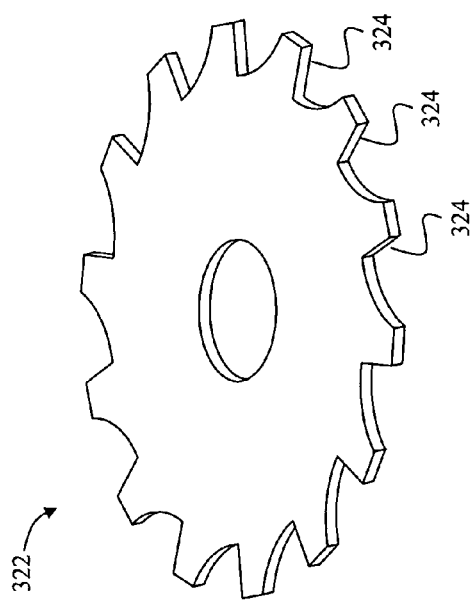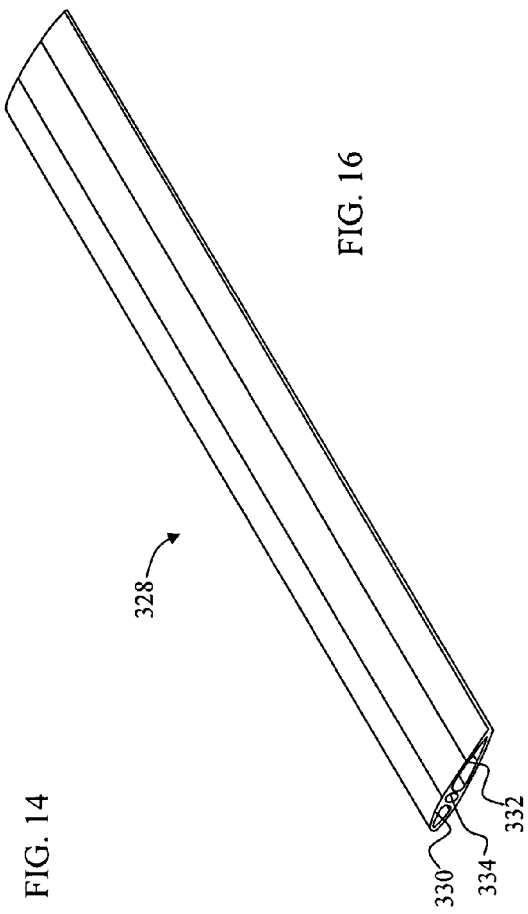

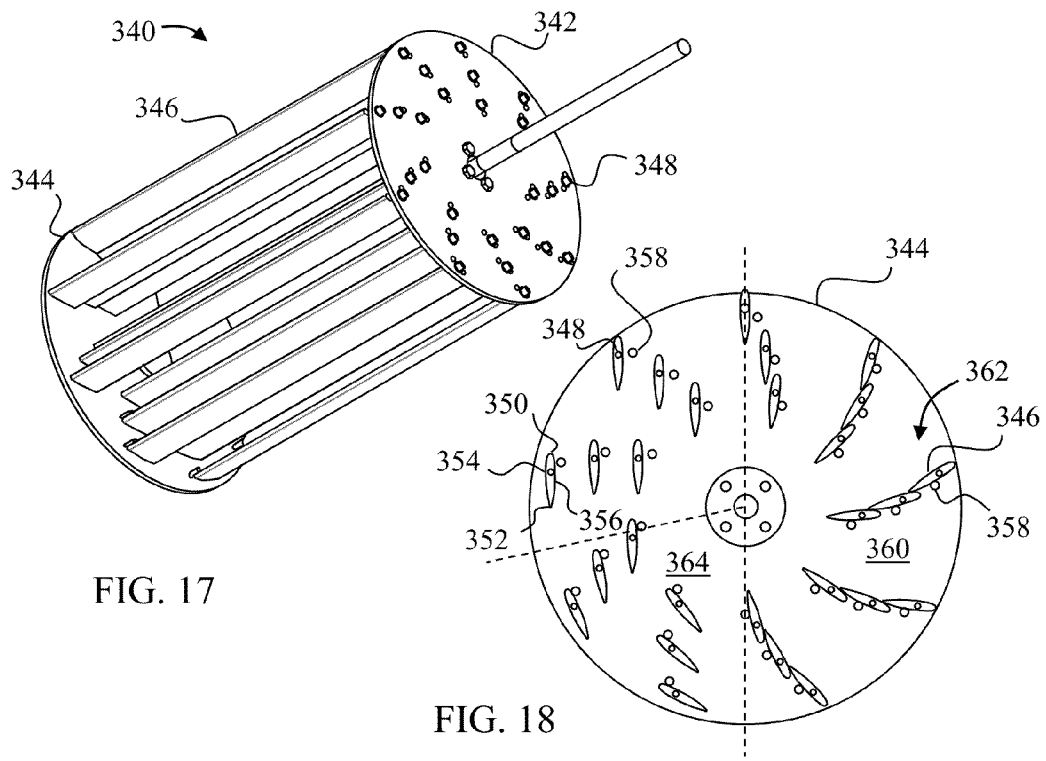
FIG. 17
FIG. 18
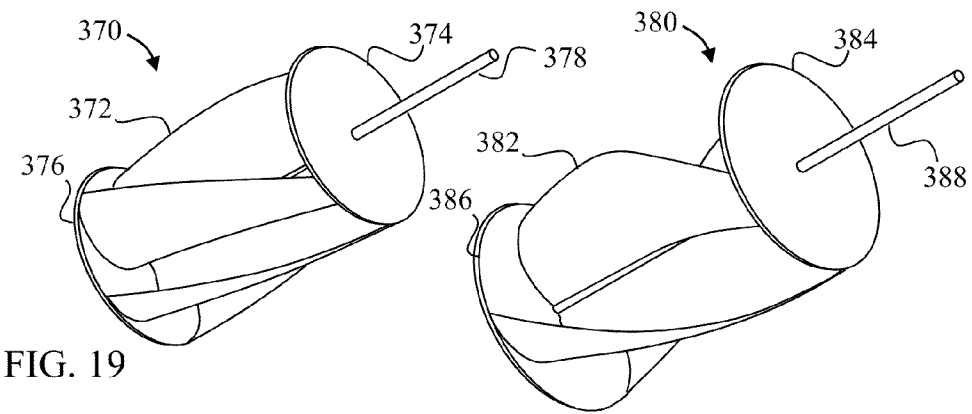
FIG. 19
FIG. 21
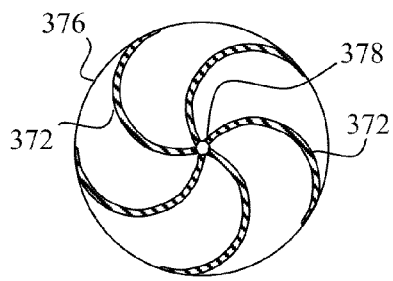
FIG. 20
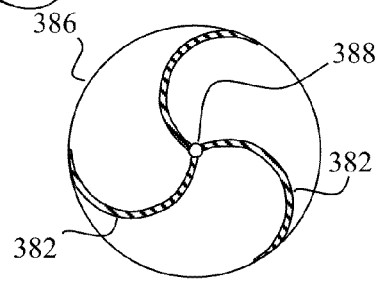
FIG. 22

US 8,664,784 B2

LOUVERED TURBINE FOR GENERATING ELECTRIC POWER FROM A WATER CURRENT

This application is a continuation in part application of PCT/US08/71239, filed on Jul. 25, 2008, and U.S. patent application Ser. No. 11/519,607, filed Sep. 12, 2006, now U.S. Pat. No. 7,471,006 which issued Dec. 30, 2008, which claims the benefit of provisional U.S. Patent Application No. 60/716,063, filed on Sep. 12, 2005.

FIELD

The present invention relates generally to the field of hydroelectric power generation, and, more particularly, to an apparatus and method for generating electric power from a subsurface water current.

BACKGROUND

The wealth of the United States has been created largely through the exploitation of cheap energy provided by the past abundance of fossil fuels. Because of the increasing shortages of natural gas in North America, the continued reliance on oil suppliers located volatile regions, the approaching worldwide shortages of oil, and because of the growing danger of global warming that may be caused by the combustion of fossil fuels, clean reliable sources of renewable energy are needed.

Many of the efforts to develop power generation systems fueled by renewable energy sources have been focused on wind energy. Although wind powered generating systems provide many benefits, they have a significant drawback. Specifically, wind direction and speed are in a constant state of flux. Wind speeds can fluctuate hourly and have marked seasonal and diurnal patterns. They also frequently produce the most power when the demand for that power is at its lowest. This is known in the electricity trade as a low capacity factor. Low capacity factors, and still lower dependable on-peak capacity factors, are notable shortcomings of wind power generation.

In contrast to the winds, rivers and streams provide a relatively stable current. Additionally, some deep ocean currents are driven largely by relatively steady Coriolis forces. The fact that such ocean currents are not subject to significant changes in direction or velocity makes sub-sea power generation somewhat more desirable than the intermittent power produced by wind-driven turbines. The book, Ocean Passages of the World (published by the Hydrographic Department of the British Admiralty, 1950), lists 14 currents that exceed 3 knots (3.45 mph), a few of which are in the open ocean. The Gulf Stream and the Kuro Shio are the only two currents the book lists having velocities above 3 knots that flow throughout the year. Both of these currents are driven by the Coriolis force that is caused by the Earth's eastward rotation acting upon ocean currents produced by surface trade winds. Because these currents are caused largely by the Earth's rotation, they should remain constant for a substantial period barring significant changes in local geography.

The Gulf Stream starts roughly in the area where the Gulf of Mexico narrows to form a channel between Cuba and the Florida Keys. From there the current flows to the northeast through the Straits of Florida, between the mainland of the United States and the Bahamas, flowing at a substantial speed for some 400 miles. The peak velocity of the Gulf Stream is achieved off of the coast of Miami, Fla., where the Gulf Stream is about 45 miles wide and 1,500 feet deep. There, the current reaches speeds of as much as 6.9 miles per hour at a location between Key Largo, Fla. and North Palm Beach, Fla., and less than 18 miles from shore. Farther along it is joined by the Antilles Current, coming up from the southeast, and the merging flow, broader and moving more slowly, continues northward and then northeastwardly, as it roughly parallels the 100-fathom curve as far as Cape Hatteras, N.C.

The Kuro Shio is the Pacific Ocean's equivalent to the Gulf Stream. A large part of the water of the North Equatorial current turns northeastward east of Luzon and passes the east coast of Taiwan to form this current. South of Japan, the Kuro Shio flows in a northeasterly direction, parallel to the Japanese islands, of Kyushu, Shikoku, and Honshu. According to Ocean Passages of the World, the top speed of the Kuro Shio is about the same as that of the Gulf Stream. The Gulf Stream's top flow rate is 156.5 statute miles per day (6.52 mph) and the Kuro Shio's is 153 statute miles per day (6.375 mph).

Other possible sites for subsurface generators are the East Australian Coast current, which flows at a top rate of 110.47 statute miles per day (4.6 mph), and the Agulhas current off the southern tip of South Africa, which flows at a top rate of 139.2 statute miles per day (5.8 mph). Another possible site for subsurface generators is the Strait of Messina, the narrow opening that separates the island of Sicily from Italy, where the current's steady counter-clockwise rotation is produced primarily by changing water densities resulting from evaporation in the Mediterranean. Oceanographic current data may suggest other potential sites.

Submersible turbine generating systems can be designed to efficiently produce power from currents flowing as slowly as 3 mph—if that flow rate is consistent—by increasing the size of the turbines in relation to the size of the generators, and by adding more gearing to increase the shaft speeds to the generators. Because the Coriolis currents can be very steady, capacity factors of between 70 percent and 95 percent may be achievable. This compares to historical capacity factors for well-located wind machines of between 23 percent and 30 percent. Because a well-placed submersible water turbine will operate in a current having even flow rates, it may possible for it to produce usable current practically one hundred percent of the time.

Moreover, increasing human ingress into the oceans makes undersea power generation desirable. Historically, submarines have had to periodically surface and dock at shore based ports for maintenance that has included recharging or replacing electric batteries and/or receiving temporary electric power during the maintenance of their on-board generators. Such needs to periodically travel to shore based facilities have undesirably limited the mission capabilities of many submarines. A suitable deep sea power generation facility could provide opportunities for submarines to obtain electric power for maintenance while remaining submerged and without diversion from the open ocean to a shore location. Additionally, as the number of underwater scientific observatories increases, so does the need to generate power for the observatories at the observatory sites. Further, whether engaged in military, scientific, commercial, or recreational activities humans need potable water. Potable water can be produced from sea water, but such production facilities typically require electricity.

Although the needs are numerous, viable subsurface power generation has presented notable challenges. For example, rotating electric generators produce heat. The electric current flowing through the conductors, both in the stator and rotor, produces heat because of the electrical resistance. In addition, heat is generated in the steel of the rotor armature core by the changing magnetic fluxes and bearing, shaft, and gear friction produces heat as well. Although the heat loss in large generators is typically only on the order of about 1 percent of output, this is still considerable. For example, a pair of generators producing 1,200 kW might have a loss of 12 kW, which is equivalent to 40,973 BTU per hour. Therefore, a liquid cooling system is desirable for dissipation of heat produced by a sub-sea power generation system. Additionally, maintaining proper horizontal, vertical, and azimuthal turbine positioning relative to currents depths and directions, particularly in the ocean, for optimizing capacity factors in operation of sub-sea power generation systems has been challenging. Another challenge has been that deeply submerging power generation units has made them less readily accessible for servicing and repair.

SUMMARY

A subsurface power generating system in one embodiment includes a frame, a first electric generator supported by the frame and operably connected to a first vertical rotor, a second electric generator supported by the frame and operably connected to a second vertical rotor, a first louver operably connected to the first vertical rotor and including a front side, and a back side, and pivotable between a first position whereat the backside is in contact with a first pivot limiting structure, and a second position whereat the backside is not in contact with the first pivot limiting structure, and a second louver operably connected to the second vertical rotor and including a front side, and a back side, and pivotable between a third position whereat the backside is in contact with a second pivot limiting structure, and a fourth position whereat the backside is not in contact with the second pivot limiting structure.

In another embodiment, a method of generating electrical power from a water current includes positioning a first louver within a water current, impinging a front side of the first louver with the water current, pivoting the first louver into contact with a first pivot limiting structure using a first force generated by the impinging water current, transferring a second force from the water current to the first pivot limiting structure, and rotating a first vertical rotor operably connected to a first electrical generator with the transferred second force.

In a further embodiment, a subsurface power generating system includes a frame, a first electric generator supported by the frame, the first electric generator operably connected to a first vertical rotor, a first louver operably connected to the first vertical rotor and including a front portion, and a back portion, and pivotable between a first position whereat the back portion is in contact with a first pivot limiting structure, and a second position whereat the back portion is not in contact with the first pivot limiting structure, and a first pivot extending through the first louver and defining a first of rotation for the first louver such that the distance from the first axis of rotation to a leading end of the first louver is shorter than the distance from the first axis of rotation to a trailing end of the first louver.

The above-noted features and advantages of the present invention, as well as additional features and advantages, will be readily apparent to those skilled in the art upon reference to the following detailed description and the accompanying drawings, which include a disclosure of the best mode of making and using the invention presently contemplated.

BRIEF DESCRIPTION OF THE DRAWINGS

FIG. 1 depicts a perspective view of one of the turbines of FIG. 10;

FIG. 14 depicts a perspective view of an alternative end plate that may also be used as a strengthening web;

FIG. 15 depicts a perspective view of a bushing that may be used to increase the efficiency of a turbine;

FIG. 16 depicts a perspective view of a louver with internal cavities to increase the strength of the louver and to reduce the weight of the louver;

FIG. 17 depicts a perspective view of an embodiment of a turbine with louvers which self-align into louver blades using pivot pins to limit pivoting of the louvers;

FIG. 18 depicts the lower end plate and self-aligning louvers of the turbine of FIG. 14 showing the movement and position of the louvers in the primary drive zones, secondary drive zones, and the flutter zones of the turbine as the turbine rotates;

FIG. 19 depicts a perspective view of an embodiment of a turbine with fixed louvers which extend helically about a central shaft;

FIG. 20 depicts a top cross-sectional view of the turbine of FIG. 19 showing five fixed helically extending louvers;

FIG. 21 depicts a perspective view of an embodiment of a turbine with fixed louvers which extend helically about a central shaft;

FIG. 22 depicts a top cross-sectional view of the turbine of FIG. 21 showing three fixed helically extending louvers.

DETAILED DESCRIPTION

Figure 1:
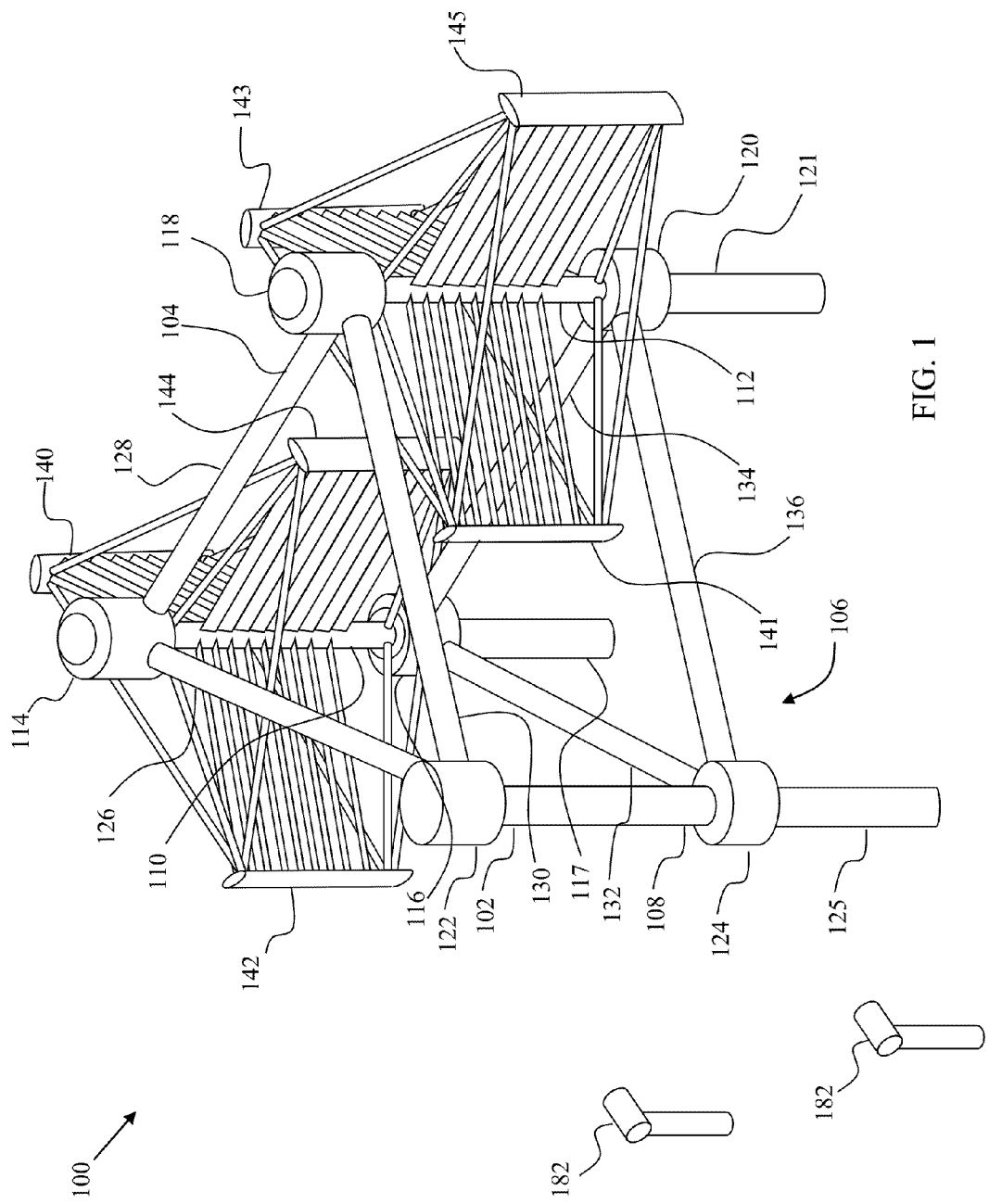
FIG. 1 depicts a perspective view of an exemplary manned subsurface electric power generation station in accordance with principles of the present invention.

Like reference numerals refer to like parts throughout the following description, the accompanying drawings, and the claims.

FIG. 1 shows a perspective view of an exemplary sub-sea electric power generation station 100 according to the present invention. The station 100 is designed to operate 24 hours per day and 365 days per year while totally submerged to supply power to an onshore power grid through an umbilical (not shown). The station 100 is marine creature, biomass, and navigational friendly, and is suitable for, among other locations, geographic locations where fairly constant, vector specific sub sea currents are present. It should be appreciated that there are numerous worldwide locations (e.g., North American Gulf Stream areas such as the Florida, Ga., and South Carolina coasts, among others) where constant, vector specific, sub-sea currents can be harnessed to generate electricity. In addition to the ability to generate electrical energy, the station 100 is capable of producing significant quantities of potable water.

The station 100 includes a neutrally buoyant, manned, one atmosphere, frame 102. The frame 102 includes a generally horizontally oriented upper triangularly shaped pressure resistant structure 104, a generally horizontally oriented lower triangularly shaped pressure resistant structure 106, and three substantially hollow generally vertically oriented legs or "spars" (a first spar 108, a second spar 110, and a third spar 112) extending between the structure 104 and the structure 106.

The triangularly shaped structures 104 and 106 and the spars 108, 110 and 112 are generally cylindrical in construction and manufactured to appropriate standards such as American Society of Mechanical Engineers (ASME) standards for a pressure vessel for human occupancy (PVHO-2, section VIII, Division I), National Board, American Bureau of Shipping (ABS) and U.S. Coast Guard (USCG) standards. The frame 102 is configured to be neutrally buoyant. Neutral buoyancy may be achieved by a variety of combinations of water displacement by the station 100 and permanent and variable buoyancy including the use of "hard" and "soft" ballast tanks and syntactic foam. The upper triangular structure 104 in this embodiment provides living quarters similar to those found onboard a merchant vessel including berthing quarters, restrooms, showers, common rooms, off duty rooms, food preparation and storage areas, a small infirmary, a communication and media room, an exercise area, etc. Additionally, the upper triangular structure 104 provides a storage area for emergency equipment such as an emergency escape pod and a one atmosphere absolute transfer-under-pressure (One ATATUP) module.

The lower triangular structure 106 provides additional space for storage and equipment. By way of example, water generators (either reverse osmosis ("R/O") or distilling type), a sanitary station, water heaters, control equipment, fire suppression systems ("FSS"), a decompression chamber, a diver lock out compartment ("DLOC"), remote vehicle lock out ports ("ROVLOCs"), air chargers and environmental control units ("ECU") are provided with the station 100. The environmental control units include oxygen generators, scrubbers and burners. The lower triangular structure 106 further houses tanks for the storage of potable water, pressurized air and oxygen and one or more heat exchanger systems for thermal cooling of rotating machine parts and for using the heat generated by the machine parts to heat the station. Additionally, a battery provides a back-up power supply in case power generation is disrupted and the power grid is not available.

The station 100 includes six nodes. Nodes 114 and 116 are joined by the spar 110, nodes 118 and 120 are joined by the spar 112 and nodes 122 and 124 are joined by the spar 108. Six additional spars further join the various nodes. Specifically, along the upper structure 104 spar 126 joins nodes 122 and 114, spar 128 joins nodes 114 and 118, and spar 130 joins nodes 118 and 122. Along the lower structure 106 spar 132 joins nodes 124 and 116, spar 134 joins nodes 116 and 120, and spar 136 joins nodes 120 and 124. Each of the passageways between the nodes and the spars may be sealed by a watertight door (not shown) to isolate the various areas in case of flooding or other emergency. The nodes 116, 120 and 124 are secured to pylons 117, 121 and 125, respectively. The pylons 117, 121 and 125 are anchored in the seafloor.

Figure 2:
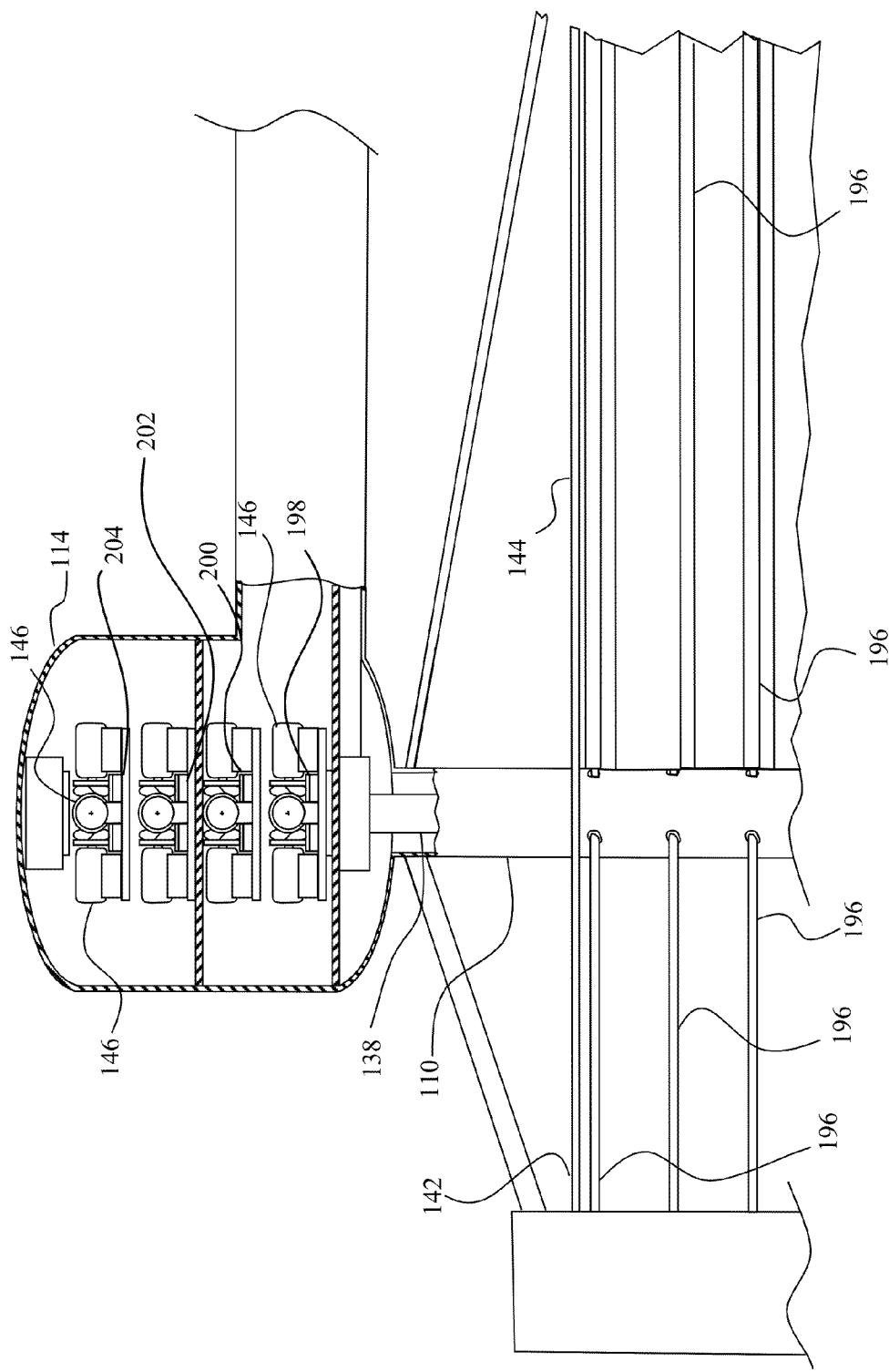
FIG. 2 depicts a partial cutaway view of a generating node of the station of FIG. 1 showing a number of modular generators coupled to a plurality of universal gears through individually controllable clutch mechanisms.

The spar 110 and the spar 112 serve as housings for vertical drive shafts. With reference to FIGS. 1 and 2, a drive shaft 138 extends between the nodes 116 and 114. The drive shaft 138 is coupled to three louver panels 140, 142 and 144. The louver panels 140, 142 and 144 are rotatably supported by the spar 110. The drive shaft 138 drives a number of modular electrical generators such as modular generators 146. The spar 112 is similarly configured with louver panels 141, 143 and 145. Thus, in this embodiment each power generator node 114, 116, 118, and 120 houses sixteen stacked modular generator units.

The spar 108 is outfitted with instrumentation and blade/vane microprocessors that control closing of the various louver panels such as louver panels 140, 141, 142, 143, 144 and 145 in the proper sequence to maximize the extraction of kinetic energy from the water current and controls opening of the various louver panels in order to minimize the surface resistance of the louvers that are rotating back into the "driven position." The lower portion of this instrumentation spar 108 also provides a one-atmosphere scientific observation station.

Figure 3:
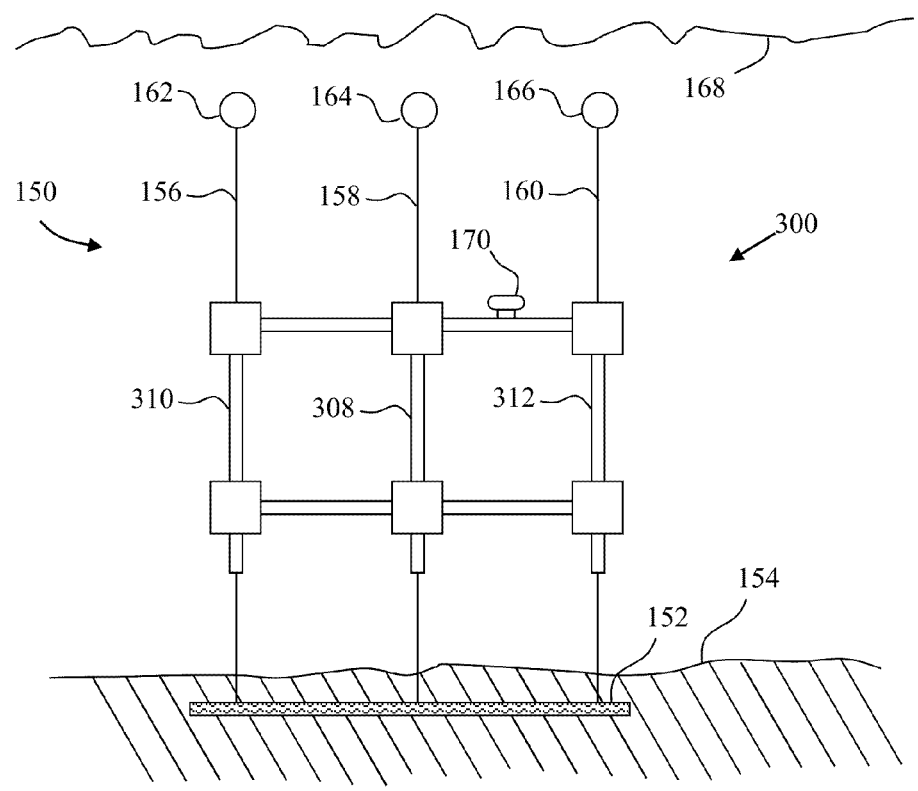
FIG. 3 depicts schematic view of an anchoring and positioning system used with an alternative manned subsurface electric power generation station in accordance with principles of the present invention.

FIG. 3 shows an alternative station 300 with various components removed to more clearly show an anchoring and positioning system 150. The anchoring and positioning system 150 includes a massive circular "mud pad" type anchor 152 that is buried in the seafloor 154 using high-pressure waterjets as is known to those of ordinary skill in the relevant art.

The system 150 further includes three stainless steel "tension leg" cables 156, 158 and 160 which extend from the mud pad 152 and are held in tension by respective redundant, syntactic foam filled, stainless steel subsurface buoys 162, 164 and 166. The length of the cables 156, 158 and 160 is selected such that the subsurface buoys 162, 164 and 166 are not maintained at a depth to pose a significant impediments to surface going vessels (under power or tow) in any sea state. Alternatively, the station 300 may be located in an area where fishing and navigation are restricted to avoid entanglement or damage. Each individual stainless steel tension leg cable 162, 164 and 166 passes through the corresponding vertical spar 310, 308 or 312 of the station 300. The cables 162, 164 and 166 of the system 150 are equipped with emergency buoyancy devices so any portions of damaged/fouled cable will float to the surface rather than sink and potentially entangle in the louver panels.

The anchoring and positioning system 150 further includes large spool winches and/or other suitable hydraulic traction devices (not shown) located inside each of the respective spars 308, 310 and 312. The anchoring and positioning system 150 submerges the station 300 to the selected operational depth by employing the winches to draw in cable and pull the station 300 toward the sea floor 154. Conversely, the winches may also be used to allow the station 300 to "crawl" from the selected operational depth up to the tension leg buoys 162, 164 and 166. The variable ballast tanks may be used to provide the station 300 with negative or positive buoyancy to reduce the load on the winches during these operations.

Additionally, the anchoring and positioning system 150 can rapidly semi-surface the station 300 to a shallow depth by releasing the cables 156, 158 and 160 and using the variable ballast tanks to provide a positive buoyancy. In either event, the station 300 may be positioned to just below the surface 168 of the ocean where it can be serviced by conventional diving equipment.

The station 300 also includes a tethered one-atmosphere "elevator" pod 170 that can be surfaced and submerged from the station 300 by releasing or retracting a cable from a cable winch mounted on the station 300. The pod 170 can be used for transporting equipment from the surface 168 to the submerged station 300. The pod cable is equipped with emergency buoyancy devices so any portions of damaged/fouled cable will float to the surface rather than sink and potentially entangle in the louver panels.

Returning to FIG. 1, the station 100 is further configured to produce large quantities of potable water. In addition to employing the louver panels to generate electric power, the system employs either generated electrical power or the mechanical force of the rotating louver panels 140, 141, 142, 143, 144 and 145 to power high pressure water pumps that pull in ambient sea water through marine biology friendly (suction break) filters and to force the high pressure sea water through a reverse osmosis membrane to produce fresh potable water. Alternatively, the sea water may be distilled. If needed, the potable water may be micro gas chlorinated. The potable water is then available for consumption on station 100 during manned operations and/or may be pumped to a mainland water facility via buried pipelines.

The station 100 further includes a brine diffusion system (not shown), a holding tank that collects the brine ("flush") of the reverse osmosis process, and a pump that injects the brine into the brine diffusion system. The brine diffusion system includes long runs of perforated pipe and a pump that forces a strong flow of ambient seawater through the pipe. The system injects the brine solution into the pipes in metered doses and the brine then diffuses into the surrounding sea water through the perforated piping in a controlled manner so as to not salt poison marine life. This ameliorates undesirable production of salt clouds in the water column that could be poisonous to marine life. Preferably, the brine diffusion piping is located downstream from the station 100.

Figure 4:
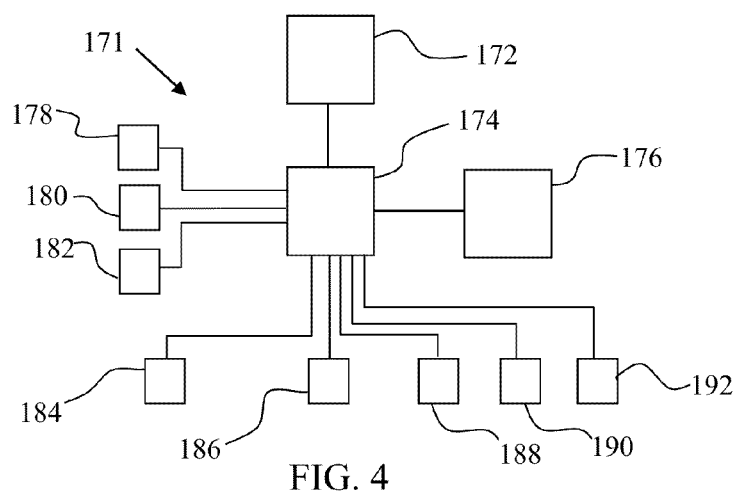
FIG. 4 depicts a schematic view of a control network for the various subsystems of the manned station of FIG. 1 in accordance with principles of the present invention.

Operations of the station 100 are controlled through a station computer network 171 shown in FIG. 4. The network 171 includes a user interface 172, a microprocessor 174 and a memory 176. The microprocessor 174 is programmed to monitor and control various functions related to the operation of the station 100. By way of example, various sensors 178 associated with the production of power may be monitored. The sensors 178 in this embodiment include sensors that produce outputs corresponding to the rotational position of the louver panels 140, 141, 142, 143, 144 and 145.

The microprocessor 174 also monitors environmental conditions through sensors 180 including atmospheric conditions within the station 100. The sensors 182 provide signals corresponding to conditions upstream of the station 100. The sensors 182 in this embodiment are AQUADOPP® current meters commercially available from NortekUSA of Annapolis, Md. The sensors 182 provide outputs indicative of water temperature and water velocity. The sensors 182 are located in the current path upstream of the station 100.

The microprocessor 174 is further programmed to provide various control functions. By way of example, the microprocessor 174 provides control signals to various systems 184 used to maintain the environment of the station 100 habitable. The systems 184 include the heating, ventilation and air conditioning systems. The microprocessor further controls the machinery associated with fire suppression systems 186, communication systems 188, and auxiliary systems 190.

The microprocessor further controls various systems 192 associated with power generation including control of the louver panels. Control of the louver panels is described with reference to FIG. 5. The water current is moving in the direction indicated by the arrow 194. The speed of the current is sensed by the sensors 182 and a signal is passed to the microprocessor 174. A signal indicative of the position of the louver panels 140, 141, 142, 143, 144, and 145 is passed to the microprocessor 174 from the sensors 178. The microprocessor 174 is programmed to compute a projected impact time based upon the received input for each of the louver panels 140, 141, 142, 143, 144, and 145.

Figure 5:
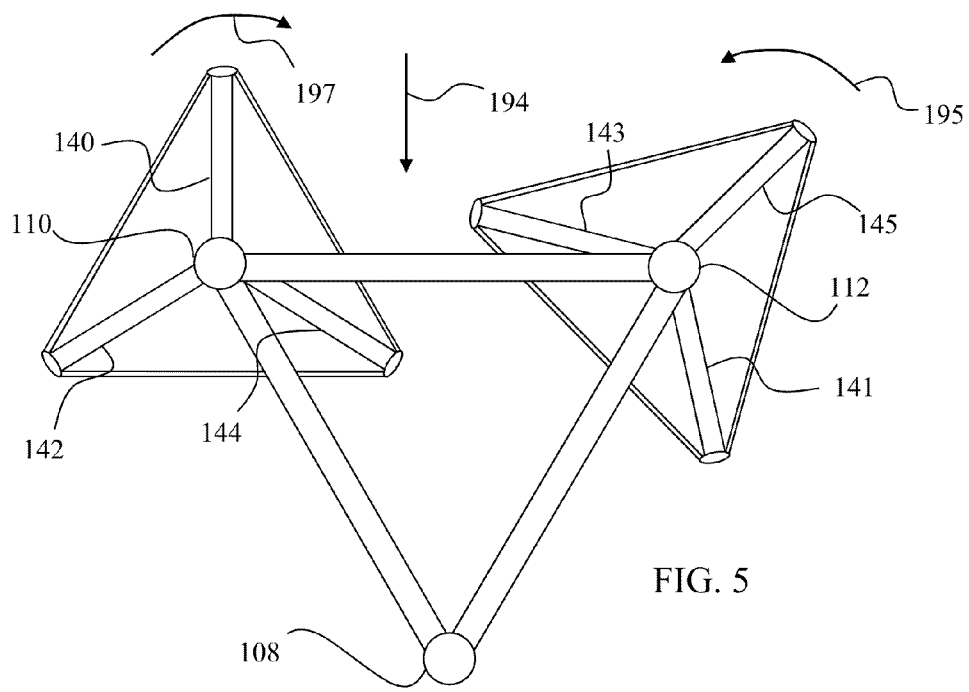
FIG. 5 depicts a top plan view of the station of FIG. 1.

In other words, as the louver panels 140, 141, 142, 143, 144, and 145 rotate about the spars 110 and 112 in the direction indicated by arrows 195 and 197, the microprocessor 174 projects the time at which a line drawn from the respective spar 110 or 112 through the louver panels 140, 141, 142, 143, 144, and 145 is pointed directly toward the direction from which the current is coming (referred to herein as aligned with the current). In FIG. 5, the louver panel 140 is nearly aligned with the current. Thus, as the louver panels 140, 141, 142, 143, 144, and 145 continue to rotate past the point at which they are aligned with the current, the microprocessor 174 issues a control signal which causes the louvers 196 on the particular louver panel to move to a closed position, creating a relatively large surface for receiving kinetic energy from the current.

The current continues to provide force against the closed louver panels until the louver panel is aligned with the current on the downstream side. In FIG. 5, the louver panel 141 is nearly aligned with the current on the downstream side. Beyond this position, any force of the current on the louver panel acts to slow the rotation of the louver panels. Accordingly, the microprocessor 174 issues a control signal causing the louvers 196 (see FIG. 2) on panels that are aligned with the current on the downstream side to open thereby reducing the effective surface area of the louver panel.

Those of ordinary skill in the art will further appreciate that the torque on the station 100 from the louver panels 141, 143 and 145 are countered by the torque on the station 100 from the louver panels 142, 144 and 140.

In one embodiment, the microprocessor 174 is configured to determine predictive "attack angle" and "rate of attack." This calculation incorporates the rotational speed of the louver panels along with the transition speed of the louvers between the open and closed position to optimize the rotational speed of the louver panels.

The microprocessor 174 may further be used to control the louvers 196 to a "full feather" position wherein the controlled louvers 196 move to a full open position to aid in slowing/stopping rotation of the louver panels. Another controlled position is a "full tilt" position where all of the louvers 196 on each of the louver panels are controlled to a fully closed position to provide relatively low vertical resistance when changing the depth of the station 100 such as for semi-surfacing the station 100 for repairs. The louvers 196 may further be controlled to a "selective feather" position where one of the louvers 196 is set to a full open position and locked to allow repair of the motion control system for that louver while the rest of the louvers continue to function as normal in power generation.

Figure 6:
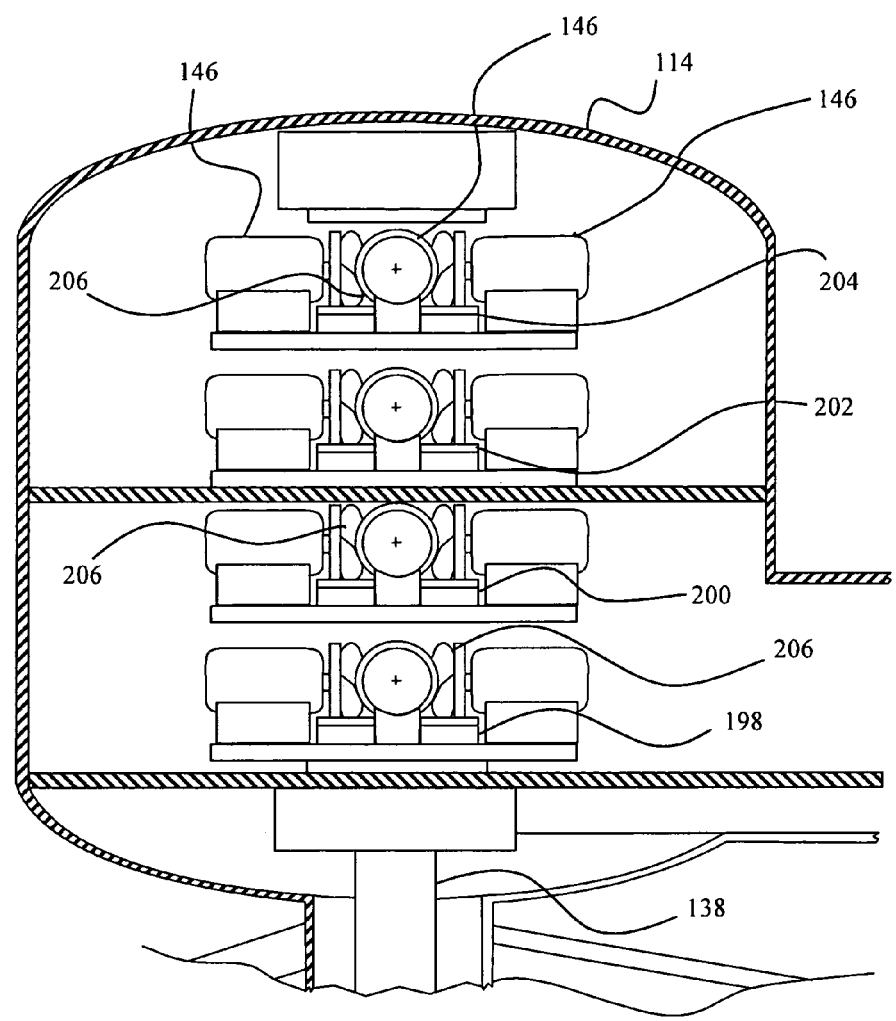
FIG. 6 depicts a partial cutaway view of the station of FIG. 1 showing additional detail of the power generating node of FIG. 2.

The microprocessor 174 also provides control functions for the power generation equipment in the power generating nodes 114, 116, 118 and 120. Referring to FIG. 6, the power generating node 114 includes four levels of modular generators 146. Each level includes four modular generators 146 arranged about the drive shaft 138. The drive shaft 138 is coupled to four universal gears 198, 200, 202 and 204. Each of the generators 146 is coupled to the universal gear 198, 200, 202 or 204 that is on the same level as the modular generator 146 by a clutch 206. The microprocessor 174 issues control signals for engaging or disengaging the individual clutches 206. Accordingly, each of the modular generators 146 may be individually removed from operation to perform maintenance or for replacement without affecting the operation of the remaining thirty-one modular generators 146 in the generating node 114.

Figure 7:
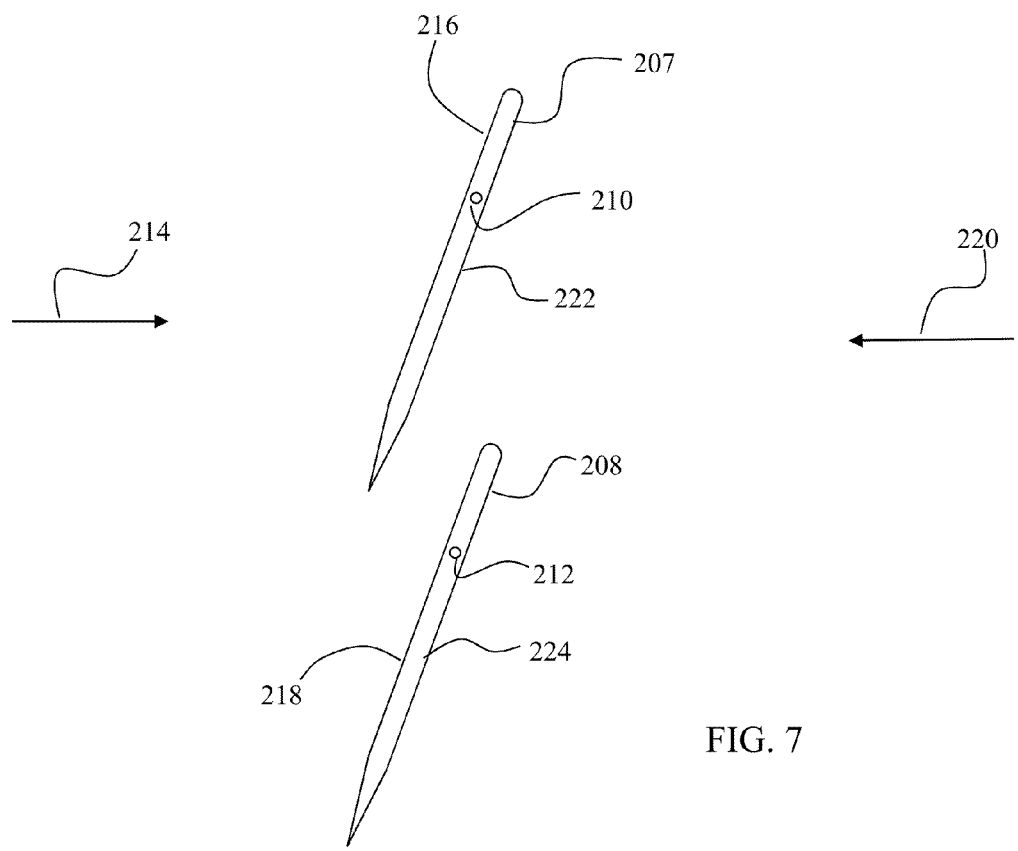
FIG. 7 depicts a schematic of the placement of crossbars with the louvers used in the louver panels of the station of FIG. 1 which reduce the need for maintenance on the louvers.

Maintenance concerns also factor into the construction of the louvers 196. By way of example, FIG.7 shows a schematic view of a louver 207 and a louver 208. The position of the louvers 207 and 208 are controlled through crossbars 210 and 212, The crossbars 210 and 212 are positioned such that the louvers 207 and 208 are somewhat cantilevered toward an open position when current flowing in the direction of the arrow 214 impacts the front surfaces 216 and 218, respectively. Conversely, when current flowing in the direction of the arrow 220 impacts the back surfaces 222 and 224, the louvers 207 and 208, respectively, experience a force moving them toward a closed position. This configuration increases the operational efficiency of the louver panels and reduces the forces on the systems used to control the louvers. Additionally, this configuration allows the louvers 207 and 208 to be used in embodiments in which the louvers are not actively controlled, but rather, allowed to pivot about the crossbars 210 and 212 in response to impingement of the current.

The louvers 207 and 208 in this embodiment are also configured to be neutrally buoyant when the station 100 is at the desired depth. Thus, less force is placed upon the various components further reducing maintenance requirements.

Figure 8:
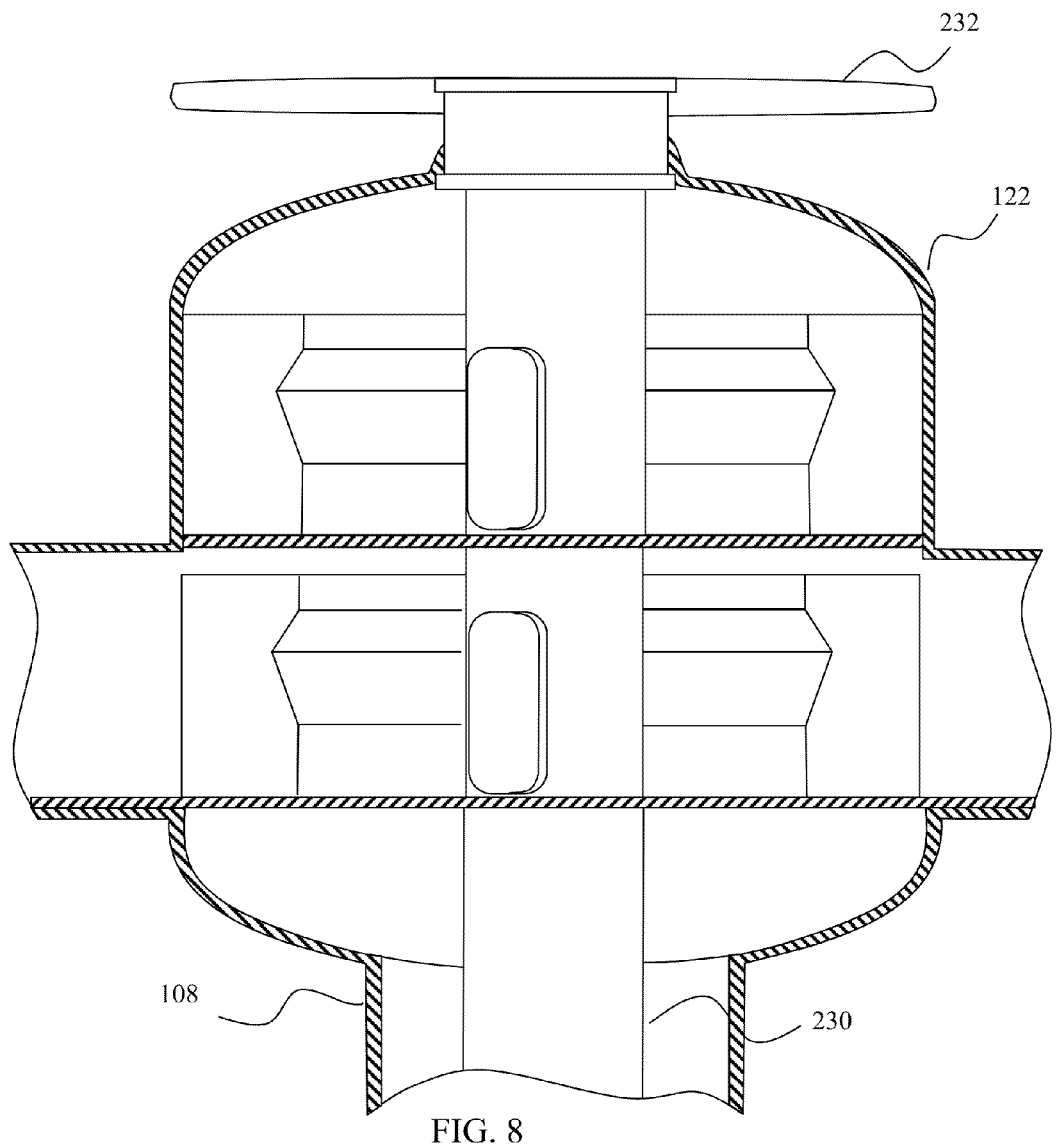
FIG. 8 depicts a partial cutaway view of the dry transfer node and elevator system of the station of FIG. 1.

The auxiliary systems 190 controlled by the microprocessor 174 include an elevator system provided in the spar 108. As shown in FIG. 8, the spar 108 encloses an elevator shaft 230 which extends between the node 122 and the node 124. The elevator shaft 230 allows for movement of personnel, supplies and equipment between the upper structure 104 and the lower structure 106. The spars 126, 128, 130, 132, 134 and 136 may further be supplied with tracks or guide rails for use in moving equipment or supplies throughout the station.

The elevator shaft 230 is located beneath a dry water skirt 232. The skirt 232 is configured to be used with a vehicle equipped with a high pressure water sweep and a rotary scrub brush. The high pressure water sweep and rotary scrub brush are used to clear biofouling and other debris from the dry transfer skirt 232. The vehicle then settles onto the dry transfer skirt 232 with the aid of stab pins to provide for proper alignment. A seal on the underside of the vehicle provides a watertight seal between the vehicle and the dry transfer skirt 232. Once the vehicle is properly positioned, the space within the seal and between the vehicle and the dry transfer skirt 232 is dewatered. The dewatering process lowers the pressure between the vehicle and the dry transfer skirt 232. Accordingly, a tight seal is maintained by the force of the ambient sea pressure acting upon the vehicle.

In accordance with one embodiment, the station 100 is situated at a water depth of 650 to 2,500 feet of seawater ("FSW"). This depth places the station 100 well below the mean water surface in a 100-year storm risk scenario. When incorporating the anchoring and positioning system 150 in 650 FSW, the mud pad 152 is buried at a depth of around 45 feet below the seafloor 154 and the three subsurface buoys 162, 164 and 166 that terminate the respective stainless steel tension leg cables 156, 158 and 160 are at a minimum of depth of around 165 FSW, still below the mean water surface in a 100-year storm risk scenario.

A manned submersible may be used to effect crew changes, delivery of food, hard mail, replacement parts, and to remove sick or injured station workers, and to deliver and replace scientists visiting the scientific observation station. Thusly located well below the "action layer" of the ocean, the station 100 is not significantly impacted by adverse surface/semi-surface conditions such as tsunamis, hurricanes, solar flares, war, etc. The station 100 is thusly also a difficult target for potential terrorism. Further, it should be noted that the louver panels 140, 141, 142, 143, 144 and 145 may open, close, and rotate slowly enough to ameliorate adverse impacts on marine life. The station 100 also includes an underwater sound broadcasting system configured to produce sounds at levels and frequencies to induce aversion/diversion maneuvers in most forms of marine life. The impact of invertebrates jellyfish, etc.) on the support columns, and blade surfaces would be comparable to the impact seen on offshore oil production structures or sunken ships.

Additionally, as the station 100 is substantially a large metal structure submerged in reasonably cool water (i.e., on the order of 39 degrees F. at a depth of around 650 FSW), the temperature of the ambient water facilitates cooling of the rotating parts with the heat exchangers.

Additionally, as the station 100 is substantially a large metal structure submerged in reasonably cool water (i.e., on the order of 39 degrees F. at a depth of around 650 FSW), the temperature of the ambient water 660 facilitates cooling of the rotating parts with the heat exchangers.

Figure 9:
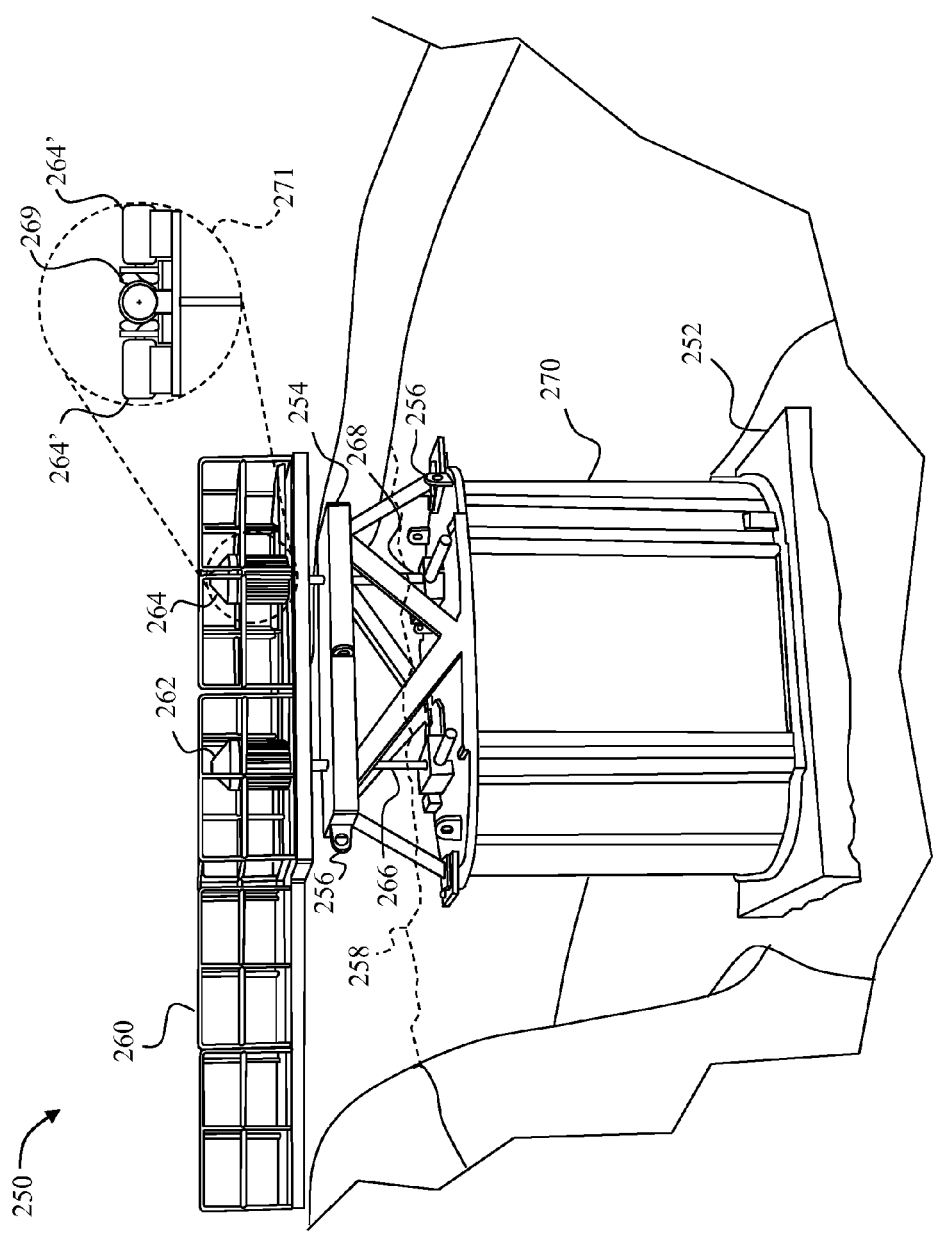
FIG. 9 depicts a perspective view of another exemplary subsurface electric power generation station in accordance with principles of the present invention.

An alternative subsurface power generation station 250 is depicted in FIG. 9. The subsurface power generation station 250 includes a base 252 and a frame 254. The base 252 functions as an anchor to maintain the power generation station 250 at a desired location in a subsurface current. The frame 254 includes a number of padeyes 256 which are used to position the power generation station 250 in the subsurface current. The padeyes 256 may be used by a ship to lower the power generation station 250 into a location removed from land or by a crane to position the power generation station 250 in a river, stream, or ocean current close to land.

The frame 254 extends from the base 252 to a location above the water surface 258. In this embodiment, the frame 254 supports a gangway 260 which is used to provide access to the power generation station 250 and to run power lines from the power generation station 250 to a load. The frame 254 further supports two generators 262, and 264 which are powered by vertical rotor shafts 266 and 268, respectively. The generators 262 and 264 in this embodiment are 5 kW LIMA®MAC generators commercially available from Marathon electric Manufacturing Corp., of Wausau, Wisconsin. If desired, more than one generator may be powered by each of the vertical rotor shafts 266 and 268 such as by replacing, the generator 264 with a plurality of generators 264' and a clutch system 269, which in one embodiment is similar to the one described above with respect to the station 100, as depicted in the inset 271 of FIG. 9.

Figures 10, 11:
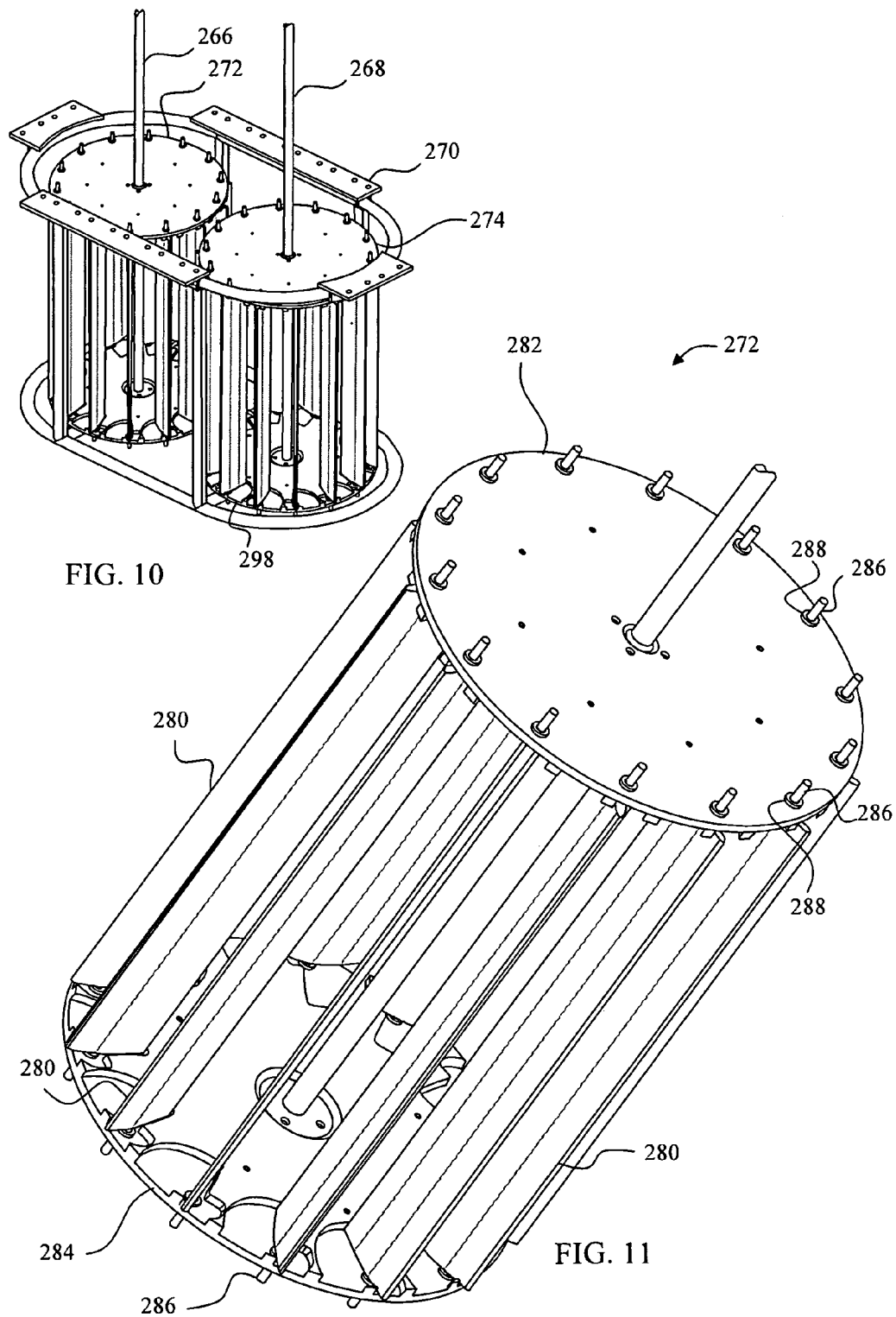
FIG. 10 depicts a perspective view of the submerged cage portion of the system of FIG. 9 with two vertical rotor, counter-rotating turbines.

The vertical rotor shafts 266 and 268 extend from the generators 262 and 264, respectively, into a cage portion 270 of the frame 254 whereat the rotor shafts 266 and 268 are coupled to two vertical axis turbines 272 and 274, respectively, as shown in FIG. 10. The turbines 272 and 274 are substantially identical and are described with initial reference to turbine 272 shown in FIG. 11. The turbine 272 includes a number of louvers 280 extending between two end plates 282 and 284. Each of the louvers 280 are pivotally connected to the end plates 282 and 284 by a respective pivot bar 286. Each of the pivot bars 286 pivots within a pivot hole 288 located in the end plates 282 and 284.

Figure 12:
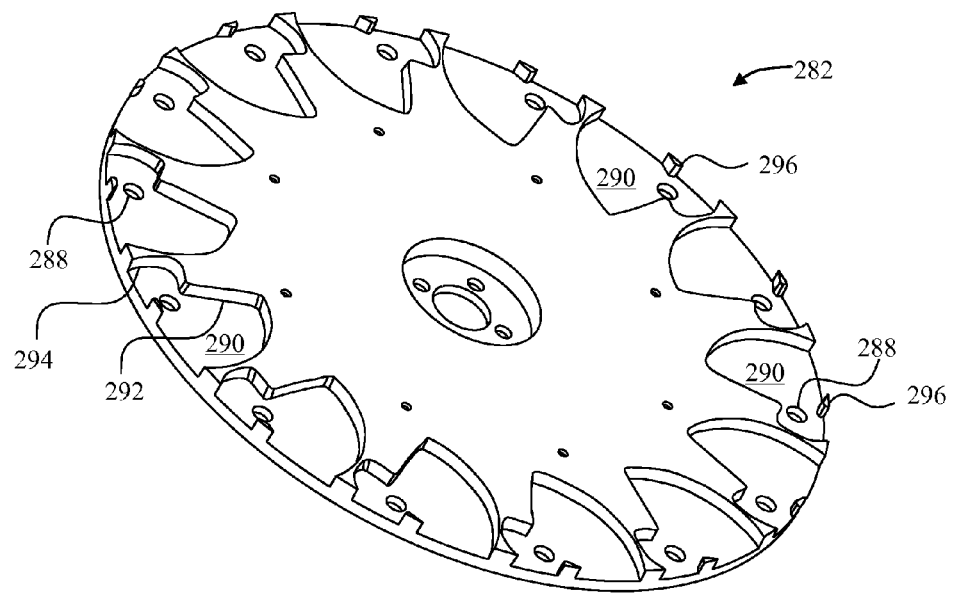
FIG. 12 depicts a perspective view of an end plate of the turbine of FIG. 11 showing louver receiving areas.
Figure 13:
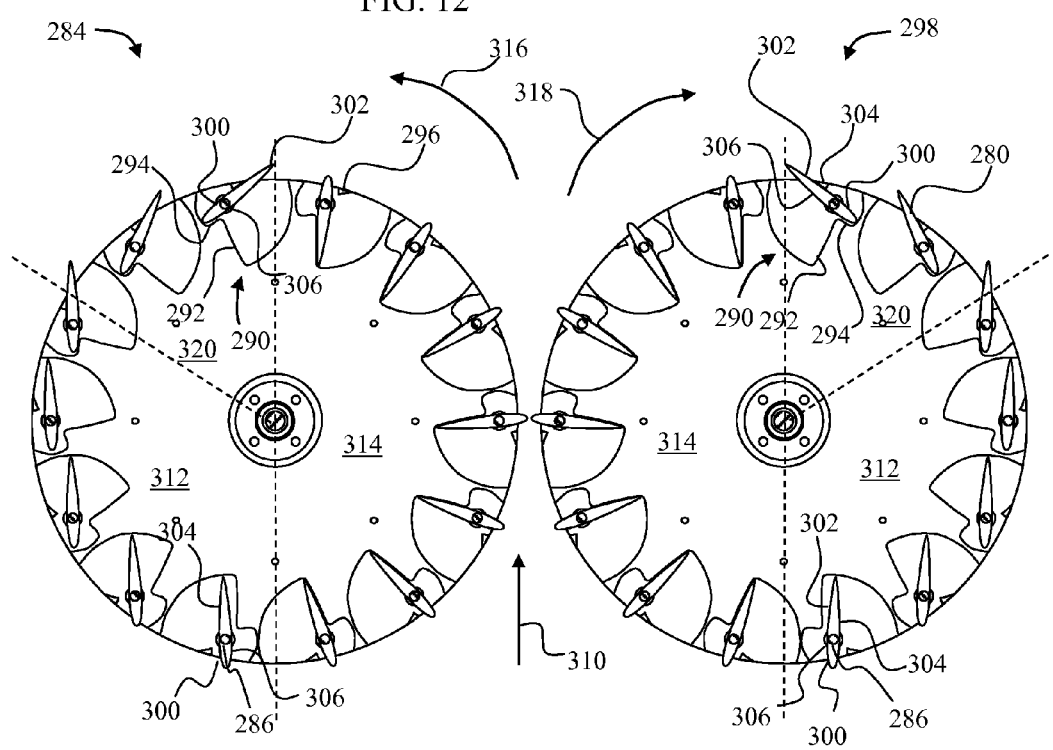
FIG. 13 depicts a plan view of the lower end plates and self-aligning louvers of the turbines of FIG. 10 showing the movement and position of the louvers in the primary drive zones, secondary drive zones, and the flutter zones of the turbine as the turbines rotate.

With reference to FIG. 12, the end plate 282 includes a number of receiving areas 290. Each receiving area 290 includes one pivot hole 288, a trailing portion pivot limiting wall 292, a leading portion pivot limiting wall 294, and a stabilizer 296. When viewed in plan, the leading portion pivot limiting wall 294 of the upper most receiving area 290 opens to the right of the trailing portion pivot limiting wall 292. Accordingly, the end plate 282 is a clockwise end plate as described more fully below. Each of the receiving areas 290 receives one louver 280 as shown in FIG. 13. The opposing end plate 284 is complimentarily formed with receiving areas. If desired, an intermediate web may be provided with the louvers extending through cutout portions of the web to provide additional stiffness.

FIG. 13 depicts the end plate 284 and the end plate 298 of the turbine 274. The end plate 284 is a counterclockwise end plate while the end plate 298 is a clockwise end plate. The pivot bars 286 divide each of the louvers 280 into a leading edge portion 300 which is shorter than a trailing edge portion 302. A front side 304 extends between the leading edge portion 300 and trailing edge portion 302 on one side of each of the louvers 280 and a back side 306 is located opposite the front side 304. The back sides 306 of the louvers 280 are the sides of the louvers 280 which contact the trailing portion pivot limiting walls 292. Thus, as shown in FIG. 13, while the louvers 280 on the turbine 272 are identical to the louvers 280 on the turbine 274, the back sides 306 of the louvers 280 on the turbine 272 are reversed from the back sides 306 of the louvers 280 on the turbine 274.

Operation of the subsurface power generation system 250 is described with reference to FIGS. 9-13. Initially, the frame 254 is lowered into a body of water with a current flow until the base 252 is resting on the bottom of the water feature and the cage portion 270 is at least partially submerged. In this embodiment, the generators 262 and 264 are preferably located above the water surface 258.

In a preferred orientation, the frame 254 is positioned such that a line extending from the vertical rotor shaft 266 to the vertical rotor shaft 268 is perpendicular to the current flow. Accordingly, a current moving in the direction of the arrow 310 in FIG. 13 will drive both turbines 272 and 274 with about the same force. As the current impinges on the louvers 280, the louvers 280 rotate through three operational zones. In a flutter zone 312, the louvers are constrained by the pivot bars 286 but they are not constrained by the receiving areas 290. Accordingly, the louvers 280 self-orient to a position of least resistance to the incoming current, with the leading edge portions 300 pointed into the incoming current.

As the turbines 272 and 274 rotate, the louvers 280 within the flutter zone 312 pivot about a pivot axis defined by the pivot bars 286. Accordingly, the back sides 306 of the trailing edge portions 302 of the louvers 280 pivot closer to the trailing portion pivot limiting walls 292. As the louvers 280 are rotated out of the flutter zone 312, they enter a primary drive zone 314. In the primary drive zone 314, the back sides 306 of the trailing edge portions 302 of the louvers 280 come into contact with the trailing portion pivot limiting walls 292.

Accordingly, as the current moves in the direction of the arrow 310, kinetic energy from the current is transmitted through the louvers 280 to the trailing portion pivot limiting walls 292 within the primary drive zone 314. In embodiments including intermediate webs, kinetic energy from the current is also transmitted through the louvers 280 to the intermediate web. The transferred kinetic energy causes the turbines 272 and 274 to rotate. The end plate 284 of the turbine 272 (the lower end plate) is a counterclockwise end plate. Accordingly, the current impinging upon the louvers 280 in the turbine 272 causes rotation of the turbine 272 in the direction of the arrow 316. The end plate 298 of the turbine 274 (the lower end plate) is a clockwise end plate. Accordingly, the current impinging upon the louvers 280 in the turbine 274 causes rotation of the turbine 274 in the direction of the arrow 318.

Transfer of kinetic energy from the current through the louvers 280 continues throughout the primary drive zone 314. As the louvers 280 are rotated toward a secondary transfer zone 320, the longitudinal axes of the louvers 280 align with the direction of the current. Once the louvers 280 are rotated into the secondary transfer zone 320, the current passing through the turbines 272 and 274 impinges the back sides 306 of the louvers 280. The impinging current forces the louvers 280 to pivot. Pivoting of the louvers 280 continues until the leading edge portions 300 of the louvers 280 contact the leading portion pivot limiting walls 294. In this embodiment, the stabilizers 296 are configured such that the front sides 304 of the louvers 280 contact the stabilizers as the leading edge portions 300 of the louvers 280 contact the leading portion pivot limiting walls 294.

Once the louvers 280 have pivoted into contact with the stabilizers 296 and the leading portion pivot limiting walls 294, additional kinetic energy is transferred through the louvers 280 to the stabilizers 296 and the leading portion pivot limiting walls 294, providing additional torque to the turbines 272 and 274.

Accordingly, the louvers 280 are self-aligning to maximize transfer of kinetic energy from the current to the turbines 272 and 274 through the primary drive zone 314 and the secondary drive zone 320, while minimizing drag through the flutter zone 312.

Other modifications may be incorporated to provide enhanced efficiency of the various turbines described herein. By way of example, FIG. 14 depicts a perspective view of a plate 322 that includes trailing portion pivot limiting walls 324. The plate 322 may be used as a portion of an end plate in a turbine or as an intermediate web to provide additional support for louvers. In turbine versions which are exposed to higher stresses and/or applications exposed to particularly harsh environments such as sea water, the plate 322 and the other plates described herein may be fabricated from a stainless steel. In smaller versions, particularly those not exposed to water with high salinity, a polymer or castable urethane, such as VIBRATHANE or ADIPRENE, commercially available from Chemtura Corporation, of Middlebury, Conn., may be incorporated in manufacturing the plate 322.

The efficiency of turbines may also be enhanced by the inclusion of bushings between components that move with respect to each other. For example, bushing 326 of FIG. 15 may be used in the various end plates described herein. The bushing 326 may also be fabricated incorporating VIBRATHANE or ADIPRENE.

Further efficiencies may be effected by decreasing the weight of the louvers. To this end, the louver 328 shown in FIG. 16 includes a leading portion cavity 330 and a trailing portion cavity 332 in addition to a shaft cavity 334. The cavities 330 and 332, which may be filled with a fluid or gas to provide a desired buoyancy, allow the weight of the louver 328 to be modified to a desired weight. Additionally, the cavities provide increased strength and stiffness for the louver 328. While stainless steel may be used to fabricate the louver 328 in certain applications, smaller versions of the louver 328 may be extruded using aluminum to further decrease the weight of the louver 328. By way of example, 6063 aluminum alloy may be used and heat treated to exhibit properties of T6 condition. Polymers such as those discussed above may be used to coat the louvers to provide additional desired properties.

FIG. 17 depicts an alternative turbine 340 that may be used to generate power from a subsurface current. The turbine 340 includes two end plates 342 and 344 which support a number of louvers 346. The louvers 346 are pivotally connected to the end plates 342 and 344 by pivot bars 348. The pivot bars 348 define a pivot axis which is located between a leading edge portion 350 and a trailing edge portion 352. The louvers 346 further include a front side 354 and a back side 356.

The turbine 340 operates in a manner similar to the turbines 272 and 274. One difference between the turbine 340 and the turbines 272 and 274 is that the end plates 342 and 344 do not include a receiving area. Rather, pivoting of the louvers 346 is constrained by an associated pivot pin 358 shown in FIG. 18 and, for most of the louvers 346, the leading edge portion 350 of the front side 304 of an adjacent louver 346. More specifically, the pivot pins 358 are positioned such that as the backside 356 of an associated first louver 346 contacts the associated pivot pin 358, the trailing edge portion 352 of the backside 356 also contacts the leading edge portion 350 of the front side 304 of an adjacent second louver 346 located inwardly of the first louver 346.

Accordingly, as the louvers 346 are rotated through a primary drive zone 360, adjacent louvers 346 form a louver blade 362. As the louvers 346 are rotated into a secondary drive zone 364, the louvers 346 pivot in a clockwise direction, as viewed in FIG. 18, and kinetic energy from an incoming current is transferred through the backside 356 of the leading edge portion 350 to the associated pivot bar 348.

In other embodiments, fixed louver turbines are used to generate power from a subsurface current. By way of example, FIGS. 19 and 20 depict a turbine 370 that includes five fixed louvers 372. The louvers 372, which extend between end plates 374 and 376, are helically formed about a vertical shaft 378. If desired, more or fewer fixed louvers may be used. Thus, the turbine 380 shown in FIGS. 21 and 22 includes three fixed louvers 382. The louvers 382, which extend between end plates 384 and 386, are helically formed about a vertical shaft 388.

Figure 23:
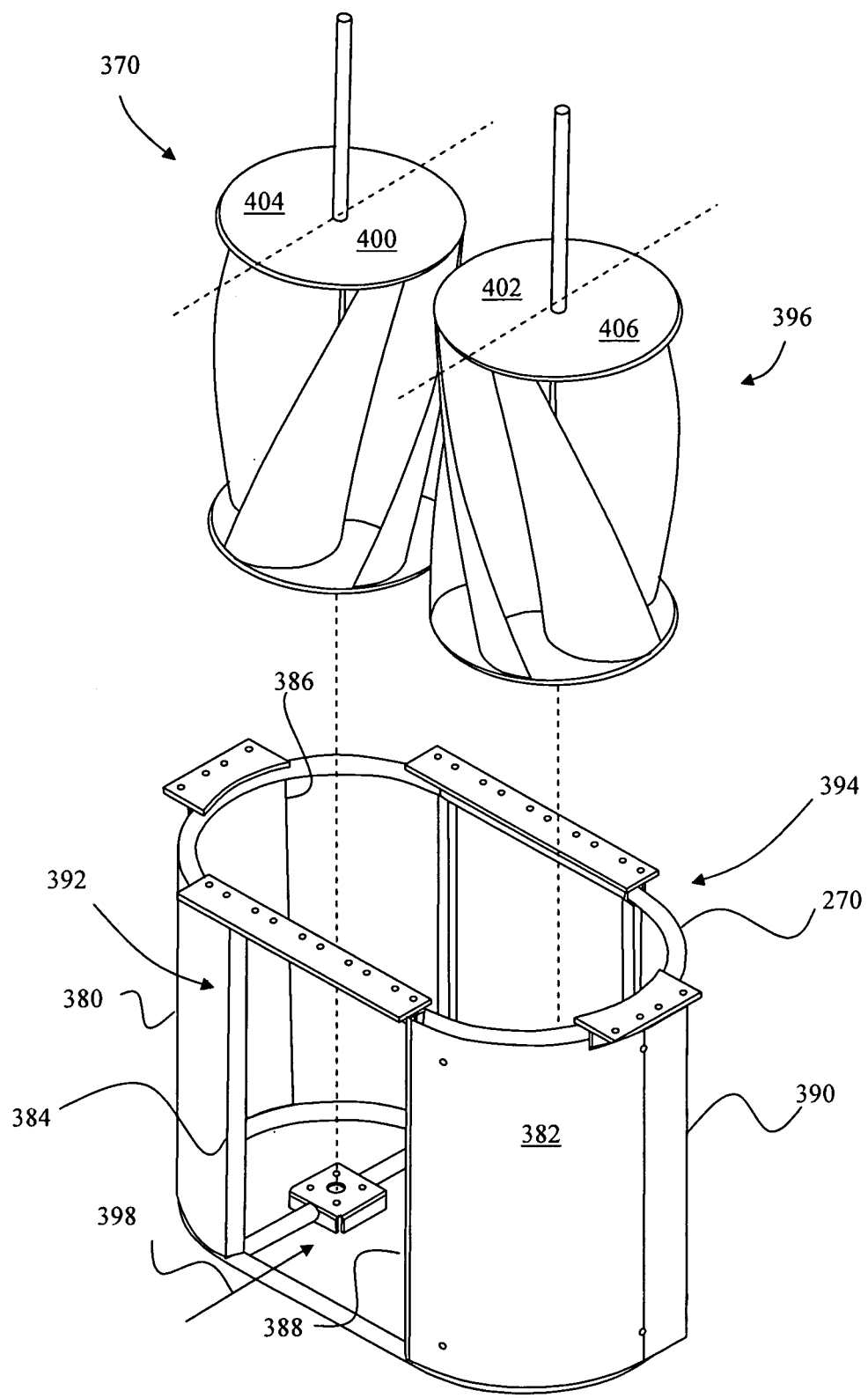
FIG. 23 depicts a perspective view of the submerged cage portion of the system of FIG. 9 with two vertical rotors, counter-rotating fixed louver turbines and baffles mounted on the cage portion to increase the efficiency of the turbines.

When a turbine with fixed louvers is used, a baffle may be used to increase the efficiency of the turbine. By way of example, the cage portion 270 of the frame 254 of FIGS. 9 and 10 is shown in FIG. 23 with baffles 380 and 382 attached thereto. Baffle 380 includes a forward lip 384 a rear portion 386. Baffle 382 includes a forward lip 388 a rear portion 390. The opposing lips 384 and 388 define a mouth 392 of the cage portion 270 and the rear portions 386 and 390 define a discharge 394.

Also shown in FIG. 23 are turbines 370 and 396. The turbine 370 is configured to rotate in a counterclockwise direction as shown in FIG. 23 when impinged by a current moving in the direction of the arrow 398. The turbine 396 is configured to rotate in a clockwise direction as shown in FIG. 23 when impinged by a current moving in the direction of the arrow 398. When the turbines 370 and 396 are installed in the cage portion 270 and placed in a current, the current is directed by the baffles 380 and 382 through the mouth 392 against the louvers 372 in the primary drive zones 400 and 402 of the turbines 370 and 396. Water which passes through the cage portion 270 is discharged through the discharge 394. The baffles 380 and 382 further deflect current about the cage portion 270 such that the current does not directly impinge the louvers 372 in the non-primary drive zones 404 and 406, thereby reducing drag and increasing the efficiency of the turbines 370 and 396.

While the present invention has been illustrated by the description of exemplary processes and system components, and while the various processes and components have been described in considerable detail, applicant does not intend to restrict or in any way limit the scope of the appended claims to such detail. Additional advantages and modifications will also readily appear to those ordinarily skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A submerged turbine power generating system for generating electrical power from a water current, the system comprising:
   a frame (254);
   a first electric generator (262) supported by the frame (254), the first electric generator (262) operably connected to a first vertical rotor (266);
   a first hollow cylindrical vertical-axis turbine (272) operably connected to the first vertical rotor (266), the first hollow cylindrical vertical-axis turbine (272) comprising:
      two end plates (282);
      a plurality of louvers (280), the plurality of louvers being operably connected to and positioned between the two end plates (282);
      wherein a plurality of receiving areas (290) is arranged along a circumference of each of said end plates (282), each of the receiving areas (290) corresponding to and receiving a respective louver (280) of the plurality of louvers (280);
      each receiving area (290) comprising a first indentation and a second indentation positioned adjacent the first indentation, the first and second indentations defining, respectively, first (292) and second (294) pivot limiting structures;
      each louver (280) of the plurality of louvers comprising a leading edge portion (300) and a trailing edge portion (302) longer than the leading edge portion (300), and each louver (280) further comprising a front side (304) and a back side (306) opposite the front side (304), the front side (304) extending between the leading edge portion (300) and the trailing edge portion (302) on one side of each of the louvers (280),
   wherein each louver (280) is pivotable between a first position whereat the trailing edge portion (302) of the back side (306) of the louver is in contact with the first pivot limiting structure (292), and a second position whereat the leading edge portion (300) of the back side (306) is in contact with the second pivot limiting structure (294).

* * * * *